United States Patent
Bryson et al.

(10) Patent No.: US 8,763,339 B2
(45) Date of Patent: Jul. 1, 2014

(54) ENERGY SAVING INSULATED SHINGLE AND METHOD OF MANUFACTURING SAME

(75) Inventors: Michael L. Bryson, Independence, MO (US); Matti Kiik, Richardson, TX (US)

(73) Assignee: Building Materials Investment Corporation, Wilmington, DE (US)

( * ) Notice: Subject to any disclaimer, the term of this patent is extended or adjusted under 35 U.S.C. 154(b) by 371 days.

(21) Appl. No.: 12/363,478

(22) Filed: Jan. 30, 2009

(65) Prior Publication Data

US 2010/0192499 A1    Aug. 5, 2010

(51) Int. Cl.
| | |
|---|---|
| *E04D 1/00* | (2006.01) |
| *E04D 1/26* | (2006.01) |
| *E04D 1/20* | (2006.01) |
| *E04D 1/28* | (2006.01) |
| *B32B 37/18* | (2006.01) |
| *B32B 38/18* | (2006.01) |
| *B32B 37/12* | (2006.01) |

(52) U.S. Cl.
CPC .............. *E04D 1/205* (2013.01); *B32B 37/182* (2013.01); *B32B 2419/06* (2013.01); *E04D 1/26* (2013.01); *B32B 2419/04* (2013.01); *B32B 38/1841* (2013.01); *B32B 37/12* (2013.01); *B32B 2305/022* (2013.01); *B32B 2309/105* (2013.01); *E04D 1/28* (2013.01)
USPC .............................................. 52/540; 52/416

(58) Field of Classification Search
USPC ........................... 52/540, 518, 553, 416, 535
See application file for complete search history.

(56) References Cited

U.S. PATENT DOCUMENTS

| | | | | |
|---|---|---|---|---|
| 1,848,965 | A * | 3/1932 | Miller | 52/540 |
| 2,161,440 | A | 6/1939 | Venrick | |
| 3,415,029 | A * | 12/1968 | Coletta | 52/419 |
| 4,717,614 | A * | 1/1988 | Bondoc et al. | 428/143 |
| 4,848,057 | A * | 7/1989 | MacDonald et al. | 52/518 |
| 5,666,776 | A * | 9/1997 | Weaver et al. | 52/557 |
| 6,038,827 | A | 3/2000 | Sieling | |
| 6,105,329 | A * | 8/2000 | Bondoc et al. | 52/557 |
| 6,968,662 | B2 * | 11/2005 | Rodrigues | 52/518 |
| 2004/0258883 | A1 * | 12/2004 | Weaver | 428/143 |
| 2005/0284070 | A1 * | 12/2005 | Binkley et al. | 52/543 |
| 2006/0265990 | A1 * | 11/2006 | Kalkanoglu et al. | 52/518 |
| 2007/0044410 | A1 * | 3/2007 | Kalkanoglu | 52/526 |

OTHER PUBLICATIONS

Office action in Mexico patent application No. Mx/a/2010/001268 dated Jul. 23, 2013.

* cited by examiner

*Primary Examiner* — Branon Painter
(74) *Attorney, Agent, or Firm* — Baker & McKenzie LLP (57) ABSTRACT

An energy saving insulated roofing shingle and related method of manufacturing. One embodiment of the shingle has an insulator attached to, or formed as part of, the interior surface of an outer layer across a portion of the headlap area about equal to the designed exposure surface area of the installed shingle. The insulation reduces the heat absorbed by the shingle and transmitted into the deck that in turn heats the attic space. The disclosed principles reduce the heat load directed into a building from the sun. In addition, the thickness of the insulation under the shingle nailing area may be minimized, thereby allowing for the normal asphalt shingle surfaces to lay against each other. Moreover, to reduce the overall shingle thickness, the insulation could replace all or part of the backsurfacing materials applied to the back of shingles in the location where the insulation is added. Additionally, asphalt applied to the back of the shingle could be reduced to accommodate insulation thickness.

39 Claims, 6 Drawing Sheets

ENERGY SAVING INSULATED SHINGLE AND METHOD OF MANUFACTURING SAME

TECHNICAL FIELD

Disclosed embodiments herein relate generally to roofing shingles and related materials, and more particularly to an energy saving insulated roofing shingle and related method of manufacturing the same.

BACKGROUND

The need for home roofing insulation to save energy costs is an on-going concern in the roofing field. Conventional roofing and siding of the prior art includes the traditional wood shingles and siding, concrete and clay tiles, and asbestos shingles and metal siding. Most of these roofing materials require periodic maintenance to keep them in satisfactory condition. Another disadvantage of such roofing materials is that they are not inherently good insulators and thus require underlying auxiliary thermal insulation in the roof, ceiling or wall structure. While wood shingles are highly decorative, they have the disadvantage of having low fire-resistance and are often prohibited by fire regulations in some localities and almost universally impose increased costs for fire insurance. Concrete and clay tiles have the disadvantage of substantial weight, thus increasing the cost of the underlying structures. It has long been apparent, therefore, that a need exists in the art for light-weight, decorative, fire-resistant siding or roofing having good thermal insulating properties.

With the advent of plastics, much research has gone into adapting its use to the roofing industry. At first, such synthetics were applied in sheet form only for their water-resistant qualities, but more recently attention has been focused on polystyrene and polyurethane foams for their heat and sound-insulating characteristics. Probably the widest use of such foam, which is typically formed from a foamable polyurethane resin reaction mixture, is to apply it while in a liquid state by hose and spraying equipment directly onto a roof bed. This technique has proven itself to be very valuable for commercial building projects, but because of its cost, the fact that it is not very pleasing aesthetically, and the fact that it is only practical on relatively flat roofs, it is not generally used as a residential roofing medium.

Noting the desirable heat and sound-insulating qualities, the industry has worked with the thermosetting polyfoams in the form of boards or large rectangular sheets having opposite broad flat surfaces from one to two inches in thickness. Typically, foam boards are laid down over the roof deck, and then the foam boards sealed to prevent leaking. Also, protective layers are generally provided on the outer flat surface of the foam boards in order to lessen decomposition thereof when certain ones of the foam materials are exposed to wind, rain and sunlight. Unfortunately, not only is this technique very complicated and costly, but also the results leave much to be desired as to eye appeal. Accordingly, it has been found that this flat-type construction is not generally desired by home owners and is seldom used.

Over the years, in spite of the above approaches, the use of asphalt-based shingles as replacement for naturally occurring materials, such as wood and slate, in order to reduce the cost of roofing has become increasingly popular. In fact, a very large industry has been developed to produce roofing using asphalt-based materials. These products have become very popular because of their ease of use and relatively low cost as compared with the aforementioned wood and slate and as also compared with traditional man-made tile roofing. However, asphalt shingles absorb heat when exposed to sun, and thus, as with wood and slate shingles, asphalt-based also offer little in the way of insulation for the roofing structures of homes. The shingle heat radiates into attic spaces where high temperatures can increase the heat load on cooled spaces in the summer. But since asphalt shingles are used on the vast majority of residential houses, it is often identified as the product to have its thermal properties improved.

Conventional approaches have mainly used insulation materials lined across the entire shingle backs. While such a use of insulation can reduce the amount of heat that is transferred by the shingle through the deck into building attic spaces, asphalt shingles require a solid surface for their installation installed for best performance. Thus, since the entire bottom surface of such shingles are lined with a thick insulation layer, one row of shingles does not bond well to a subjacent row of shingles, as is the case with bare asphalt shingles. As a result, the shingles may not provide the good wind resistance that they might otherwise provide. Also, in many locations, asphalt shingles are not allowed to be applied directly to insulation without a nailable surface, such as exterior grade plywood or oriented strand board.

SUMMARY

Disclosed herein are an energy saving insulated roofing shingle and related method of manufacturing the same. The novel shingle has an insulator attached to, or formed as part of, the interior surface of an outer layer across a substantial portion of a headlap area of the shingle. The addition of the insulation reduces the amount of heat absorbed by the shingle and transmitted into the decking material that in turn heats the attic space. More specifically, the disclosed principles do not affect the shingle's reflectivity or emissivity, but instead contributes to the same end result by reducing the heat load directed into a building from the sun.

In addition, the disclosed principles can minimize the thickness of the insulation under the shingle nailing area and thereby allow for the normal asphalt shingle surfaces to lay against each other in this application. Moreover, to reduce the overall shingle thickness if thick insulation is employed, the insulation could replace all or part of the backsurfacing materials applied to the back of shingles in the location where the insulation is added. Additionally, asphalt applied to the back of the shingle could be reduced as all of it would no longer needed with the insulation material covering the back of the headlap area. Thus, the shingles still bond to each other in the same fashion as conventional shingles do today.

In one aspect, a composition roofing shingle constructed in accordance with the disclosed principles is disclosed. In one embodiment, the shingle may comprise a bituminous first layer comprising a headlap area, a buttlap area and a common bond area between the headlap and buttlap areas, the first layer having an interior surface and an exterior surface, wherein only the exterior surface of only the buttlap area of the first layer provides an initial portion of an exposure surface of the shingle while the exterior surface of the headlap and common bond areas of the first layer are configured to be overlapped by a portion of second shingle. In addition, the exemplary shingle may include a bituminous second layer comprising a buttlap area and a common bond area, where the second layer has an interior surface and an exterior surface, and wherein portions of the exterior surface of the second layer are adhesively coupled to the interior surface of the buttlap area and common bond area of the first layer. In such an embodiment, the buttlap portions and common bond areas of the first and second layers are aligned and coextensive, and portions of the exterior surface of the buttlap area of the second layer are exposed through the buttlap area of the first layer to provide another portion of the exterior of the shingle. Still further, the exemplary shingle may comprise an insulator attached to the first layer at a top edge of the headlap area that is opposite its common bond area, and extending across the headlap area an amount substantially equal to the exposure surface of the shingle.

In another aspect, a method of manufacturing a composition roofing shingle is disclosed. In one embodiment, the method comprises forming a bituminous first layer comprising a headlap area, a buttlap area and a common bond area between the headlap and buttlap areas, where the first layer has an interior surface and an exterior surface, and wherein only the exterior surface of only the buttlap area of the first layer provides an initial portion of an exposure surface of the shingle while the exterior surface of the headlap and common bond areas of the first layer are configured to be overlapped by a portion of second shingle. Such a method may also comprise forming a bituminous second layer comprising a buttlap area and a common bond area, where the second layer has an interior surface and an exterior surface. This exemplary method may also include adhesively coupling portions of the exterior surface of the second layer to the interior surface of the buttlap area and common bond area of the first layer. The buttlap portions and common bond areas of the first and second layers are aligned and coextensive, and portions of the exterior surface of the buttlap area of the second layer are exposed through the buttlap area of the first layer to provide another portion of the exterior of the shingle. Furthermore, such a method may also provide attaching an insulator to the first layer at a top edge of the headlap area that is opposite its common bond area, and extending across the headlap area an amount substantially equal to the exposure surface of the shingle.

In a further embodiment, a composition roofing shingle is disclosed, and comprises a bituminous first layer comprising a buttlap area and a common bond area, the first layer having an interior surface and an exterior surface, wherein the exterior surface of the buttlap area of the first layer provides an initial portion of an exposure surface of the shingle. This embodiment of the composition shingle may also comprise a bituminous second layer comprising a buttlap area and a common bond area, the second layer having an interior surface and an exterior surface. Portions of the exterior surface of the second layer can be adhesively coupled to the interior surface of the buttlap area and common bond area of the first layer such that the buttlap portions and common bond areas of the first and second layers are aligned and coextensive. In addition, portions of the exterior surface of the buttlap area of the second layer may be exposed through the buttlap area of the first layer to provide another portion of the exposure surface of the shingle. Such an embodiment also comprises an insulator attached to the first layer proximate to its common bond area. In this embodiment, the insulator itself provides the headlap area of the shingle that is configured to be overlapped by a portion of second shingle.

BRIEF DESCRIPTIONS OF THE DRAWINGS

For a more complete understanding of this disclosure, and the advantages of the systems and methods herein, reference is now made to the following descriptions taken in conjunction with the accompanying drawings, in which.

DETAILED DESCRIPTION

Disclosed herein are an energy saving insulated roofing shingle and related method of manufacturing such a shingle. The novel shingle has an insulator attached to, or formed as part of, the interior surface of an outer layer across a substantial portion a headlap area of the shingle, typically equal to the surface area of the exposure surface of the shingle (i.e., the portion of the shingle exposed to the environment when properly installed on a roof deck with another single overlapping to headlap and common bond area of the first shingle). Specifically, the insulator is located behind the headlap area, which is defined for the disclosed purposes as the area of a multilayer shingle above (i.e., not including) the designed environmental exposure area on the front of the shingle. This area extends from the shingle's common bond area (double thickness area) to its top edge and extends the width of the shingle. The buttlap area of such a shingle is defined as the lower portion of the shingle (once installed) extending from the common bond area to the front edge of the shingle, and is typically the portion of the shingle exposed to the environment once all the shingles have been properly installed and are properly overlapped as designed. It should be noted that while the embodiments discussed herein place the insulation material on the underside of the headlap area, at may alternatively be placed on the topside (i.e., exterior surface) of the headlap area, and those skilled in the art will understand the modifications that might be needed to facilitate this location for the insulation material. In addition, as discussed in further detail below, the insulation material may also be used to provide the headlap portion of the shingle as well.

Figure 1:
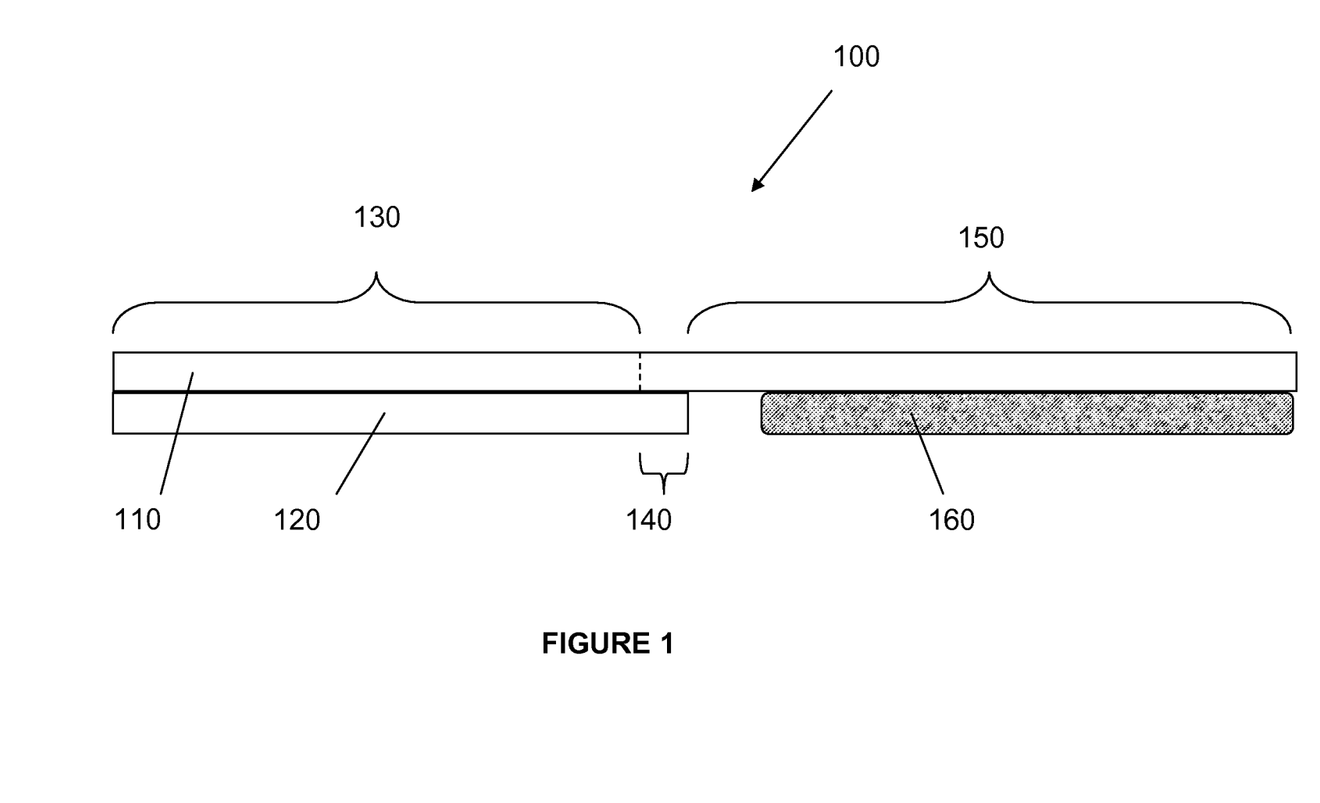
FIG. 1 illustrates a side view of one embodiment of an energy saving insulated shingle constructed in accordance with the disclosed principles.

FIG. 1 illustrates a side view of one embodiment of an energy saving insulated shingle 100 constructed in accordance with the disclosed principles. The illustrated exemplary shingle 100 includes a first shingle layer 110 and a second shingle layer 120. In this embodiment, the first shingle layer 110 provides the overall length and width of the shingle 100, while the second shingle layer 120 is constructed at the same overall width as the first shingle layer 110, but not its entire length. Although a two-layer shingle 100 is illustrated, any type of shingle may be employed with the disclosed principles, such as single layer strip shingles, or three-layer composite shingles. In addition, the term "layer" as used here does not necessarily mean that each layer is manufactured separately and later adhered together. Instead, the single 100 may be of a single final piece, manufactured of first and second laminate layers (or even more) making the shingle 100 appear as if it is two distinct adhered layers.

The shingle 100 includes the buttlap area 130 and headlap area 150 mentioned above, as well as the common bond area 140 of the shingle 100 between these two areas. As a result, the first shingle layer 110 includes the buttlap area 130, the common bond area 140, and the headlap area 150 of the shingle 100, whereas the second shingle layer 120 includes only the buttlap area 130 and the common bond area 140. The exterior surface of the first shingle layer 110 provides a large portion of the exterior surface of the shingle 100, and typically includes predetermined decorative shapes cut into the buttlap area 130. Exterior portions of the second shingle layer 120 may thus be exposed through the decorative removed portions of the first shingle layer 110 to provide the remainder of the exterior surface of the shingle 100, and the two buttlap areas alone typically provide the environmental exposure surface of the shingle. The first and second shingle layers 110, 120 are typically connected together using an adhesive, for example, a bituminous based adhesive; however, fasteners may also be employed through the common bond area 140 of the shingle 100.

In addition, the exemplary shingle 100 also includes an insulation material 160 located in the headlap area 150, adjacent to the common bond area 140 and on the interior surface of the first shingle layer 110. In accordance with the disclosed principles, the insulation material 160 may be adhered to the headlap area 150. In addition, however, the insulation material 160 may alternatively be formed into and/or as part of the first shingle layer 110. Such an embodiment is discussed in greater detail below. Providing the insulating material 160 to the back of an asphalt shingle provides resistance to the thermal transfer of heat from the shingle to the roofing deck, which when then be transferred to the building's attic space. As is well known, lower attic temperatures reduce the load on air-conditioning equipment, which in turn reduces overall utility costs for the building.

In an exemplary embodiment, the insulation material 160 is provided in sheet form, and is adhered to the backside of an asphalt shingle 100 headlap area 150 starting at a top edge of the headlap area 150 that is opposite its common bond area 140 (typically the nail zone for shingle installation), and extending across the headlap area 150 an amount substantially equal to the exposure surface of the shingle 100. For example, such an insulation sheet 160 could be from 0.010" to 1.000" thick depending on the shingle design and the compressibility of the insulation material. Of course, any advantageous insulation thickness may be employed, for example, up to several inches thick if desired. Accordingly, no limitation to any particular thickness is intended or should be implied. Expanded polystyrene (EPS) is a suitable insulation material 160, and is typically available in a thickness ranging from about 0.010 inch thick to as much as 1.000 inch thick. EPS at about 0.250 inches thick is rated as having an insulation value of R=1. Therefore, in a more specific embodiment, the insulation material 160 may be 0.125" thick, which should give an insulation value of R=0.5. R-values of the insulation material 160 are dependent on the thickness and type of insulation material used. The density and open air space are contributors to R-value ratings.

Other insulation materials 160 may be used as well, as these include (but are not limited to) isocyanurate foam, polyolefin foams, bead form expanded polystyrene, polyurethane foam, paper similar to cardboard construction, bubble insulation, or any other suitable material that can be applied to the back of the shingle in a sheet, spray or particulate form. Still further exemplary insulation materials 160 include ¼" thick extruded semi-rigid insulation (e.g., as available from Owens Corning Insulation), ⅛" thick closed cell polystyrene material, and even spray foam insulation (e.g., Great Stuff® spray insulation).

Figure 2:
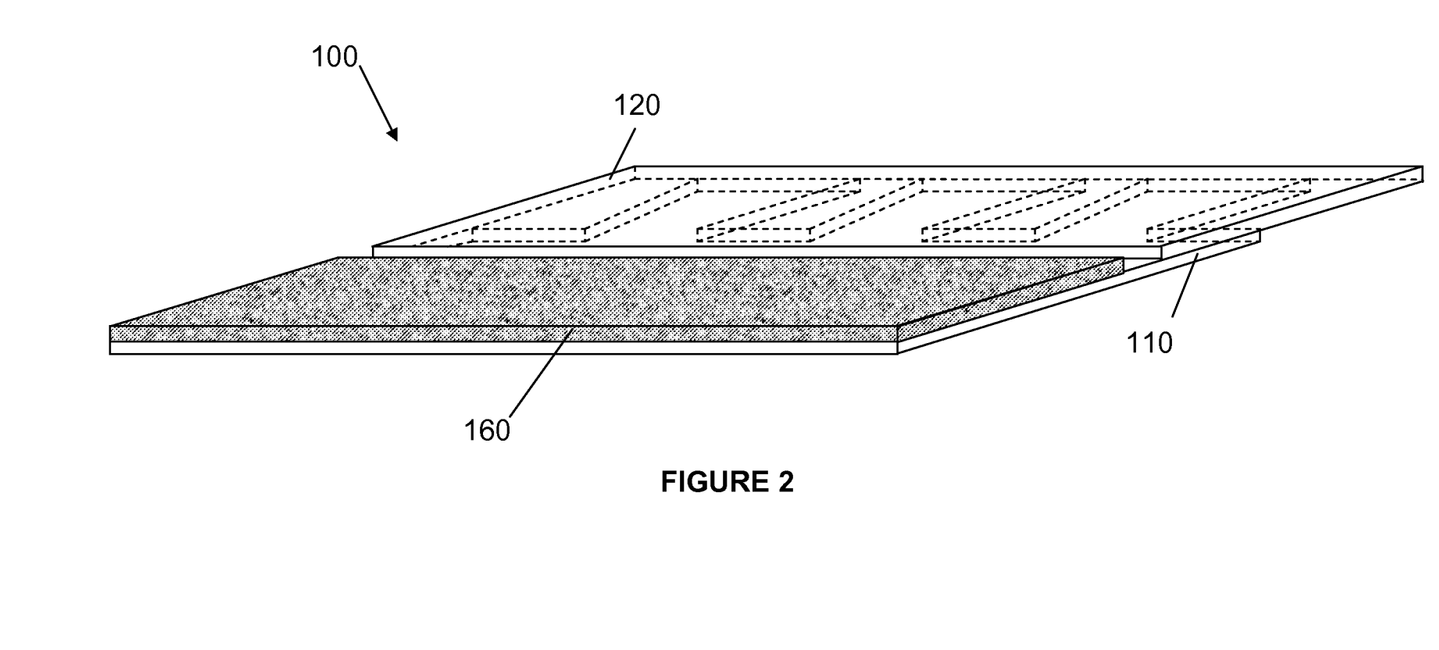
FIG. 2 illustrates an isometric view of the novel energy saving insulated shingle 100 illustrated in FIG. 1.

FIG. 2 illustrates an isometric view of the novel energy saving insulated shingle 100 illustrated in FIG. 1. More specifically, FIG. 2 illustrates the insulated shingle 100 primarily from its underside, as well as being viewed from the rear (i.e., headlap) edge of the shingle 100. This view may better illustrate how, in accordance with the disclosed principles, the insulation material 160 is located on the interior/underside surface of the first shingle layer 110, and extends from a top edge of the headlap area 150 that is opposite its common bond area 140 across the headlap area 150 an amount substantially equal to the exposure surface of the shingle 100.

In a specific example, the shingle 100 is constructed with an overall size of about 13.25 inches from its front edge at the buttlap area 130 to its back edge at the headlap area 150. The exposure surface of the shingle 100, defined as the combined buttlap areas 130 of the first and second layers 110, 120, is about 5.625 inches. The headlap area is about 6.625 inches, leaving the common bond area about 1 inch wide. However, the insulation material 160 only covers about 5.625 inches of the headlap area 150 starting from the back (or top) edge of the shingle 100 and moving towards the common bond area 140. While the insulation material 160 therefore does not reach the common bond area 140, and thus does not cover the entirety of the headlap area 150, it does cover a surface area of the interior surface of the headlap area 150 substantially equal to the designed environmental exposure surface of the shingle 100 once it has been properly installed with others of the same singles 100. In this view, the visible "dragonstooth" decorative pattern, formed in the shingle 100 by an exterior surface of the second single layer 120 being exposed through a pattern formed in the first layer 110, illustrates the designed exposure surface of the shingle 100.

The addition of the insulation material 160 reduces the amount of heat absorbed by the shingle 100 and transmitted into the decking material that in turn heats the attic space of the building or structure on which the shingles 100 are installed. More specifically, the disclosed principles do not affect the shingle's reflectivity or emissivity, but instead contributes to the same end result by reducing the heat load directed into a building from the sun. EnergyStar and the Cool Roof Ratings Council have instituted roofing requirements for reflectivity and emissivity to reduce energy consumption for air conditioning systems. While shingles 100 constructed according to the disclosed principles do not affect the shingle 100 reflectivity or emissivity, they do contribute to the same end result by reducing the heat load directed into a building from the sun. Using reflective surfacing on the shingles 100 in addition to the insulation material 160 can additionally increase the overall energy saving performance of the disclosed shingles 100.

In addition, the disclosed principles can minimize the thickness of the insulation material 160 under the shingle 100 nailing area, and thereby allow for the normal shingle surfaces to lay against each other in a typical application. Thus, the shingles 100 can still bond to each other in the same fashion as conventional shingles do today, e.g., typically with adhesives provided on the underside of the buttlap areas of shingles. Even in the event that non-asphalt shingles are employed, the insulation material 160 may still be applied to the back of the headlap area and provide the same function and advantages. Furthermore, the insulation material 160 may be tapered in thickness moving from the top edge of the headlap area 150 towards the common bond area 140 thereby reducing the thickness of the shingle 100 at the fastening area, which may aid in installation and in the seating of the shingles 100 on a roof deck.

Moreover, to reduce the overall shingle thickness if thick insulation material 160 is employed (e.g., to further increase the R-value), the insulation material 160 could replace all or part of the backsurfacing materials applied to the back of shingles 100 in the location where the insulation material 160 is added. Additionally, asphalt applied to the back of the shingle 100 (where the insulation material 160 will be located) could be reduced as it is no longer required to be as thick with the insulation material 160 covering the back of the headlap area 150. The resulting energy saving shingle 100 may therefore weigh less than similar non-insulated shingles, which may result in reduced freight or shipping expenses, as well as decreasing the per-shingle weight roofers have to face during roofing installations.

Figure 3:
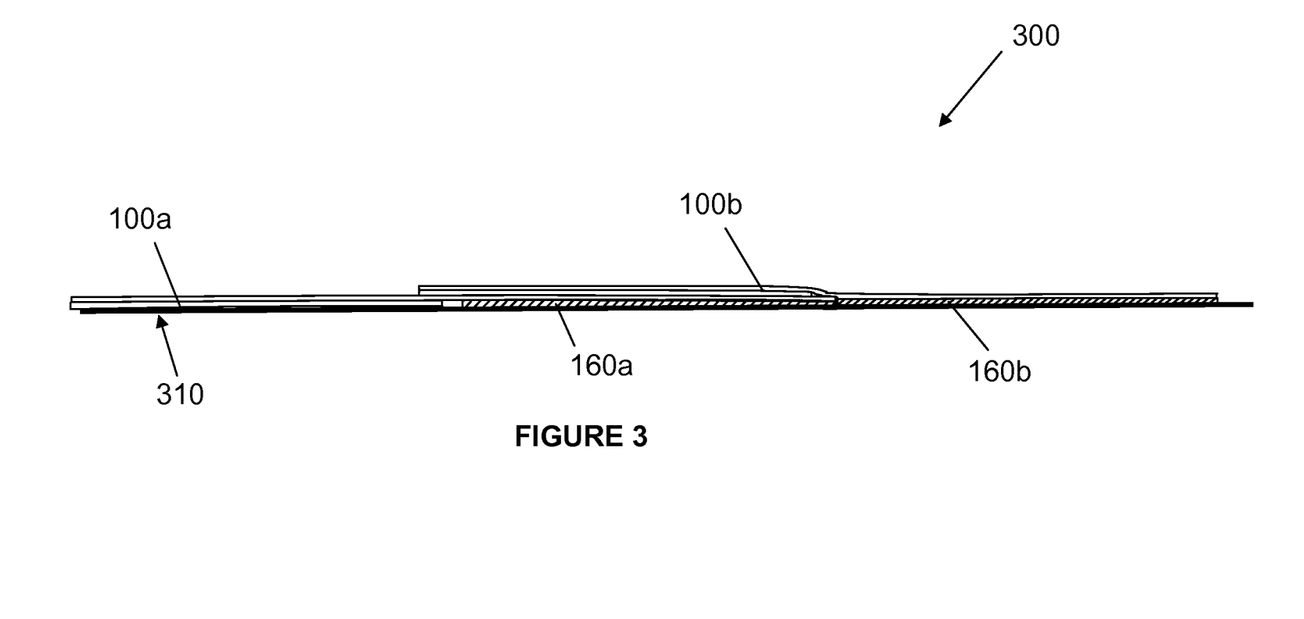
FIG. 3 illustrates a side view of an exemplary roof installation using energy saving insulated shingles constructed according to the disclosed principles.

FIG. 3 illustrates a side view of an exemplary roof installation 300 using energy saving insulated shingles 100 constructed according to the disclosed principles. In the exemplary configuration, two exemplary shingles 100a, 100b are illustrated overlapping one another on a roof deck 310. In addition, as the shingles 100a, 100b are overlapped, the insulation material 160a, 160b on each of the shingles 100a, 100b is shown adjacent to each other (end-to-end) once the shingles 100a, 100b have settled on the roof deck 310.

As in other embodiments discussed above, the shingles 100a, 100b in FIG. 3 have a headlap area that is greater than the shingles' 100a, 100b exposure surface once all shingles 100a, 100b are properly installed on the roof deck 310. However, the insulation material 160a, 160b is installed only on a portion of the headlap areas that are substantially equal to the designed exposure surface of the shingles 100a, 100b. Any shingle that uses a headlap area that is greater than the shingle's final exposure surface will benefit from the insulating shingle design disclosed herein. This is because a shingle's buttlap area is covered by the headlap area of a shingle installed in the next applied course. Also as mentioned above, however, the insulation material 160 may cover the entirety of the headlap areas, and thus overlapping insulation material 160 among the shingles 100a, 100b will be present, if desired.

In advantageous embodiments of the disclosed shingles 100a, 100b, the length of the insulation material 160a, 160b from the top edge opposite the common bond area should typically not be more than 0.250 to 0.5 inch less than the shingle's final exposure after the roof installation is complete (i.e., with the overlap of other installed shingles). With this shingle design and overlay during installation, the insulation material 160a, 160b will completely cover the roof deck 310, and thereby increases the insulation R-value of the overall shingled roof. It should be noted that the shingles 100a, 100b illustrated in FIG. 3 are shown fully seated against and sealed to one another. This is because of the shingles' 100a, 100b flexible material, such as asphalt, and thus allows the second shingle 100b to curve down after installation to seat against the first shingle 100a. More specifically, with the insulation material 160a, 160b having a size the same as the exposure surfaces, the insulation material 160a, 160b of other shingles 100a, 100b do not overlap each other in this embodiment once installed. This sizing allows for an overlapping shingle 100b to conform to the shape of its underlying shingle 100a, and thereby allows the totally of the shingles 100a, 100b to lay closer to the roof deck 310 than if the insulation material 160a, 160b overlapped. In other applications, however, it may be desirable to have the insulation material 160 partially overlap.

Moreover, insulation material 160a, 160b provided at substantially the same width as the shingles' 100a, 100b exposure surfaces also allows shingle sealant to be kept uncovered while being stored in the bundle before application. This sealant is typically present on the bottom surface of the second shingle 100b (i.e., the underside of the buttlap area of shingle 100b) to allow its adherence to the exposed headlap surface of the shingle 100a below it. Thus, the insulation material 160a, 160b present on the back/underside of the headlap area above the common bond area still allows the upper shingle 100b to be applied and fastened in a normal fashion over the lower shingle 100a. Thus, the insulation material 160a, 160b does not interfere with the fastening area or the shingles 100a, 100b sealing to one another after installation. Even further, the insulation material 160a, 160b itself may include an adhesive or other sealant, which may also be used to adhere the shingles 100a, 100b to the roof deck 310.

Figure 4:
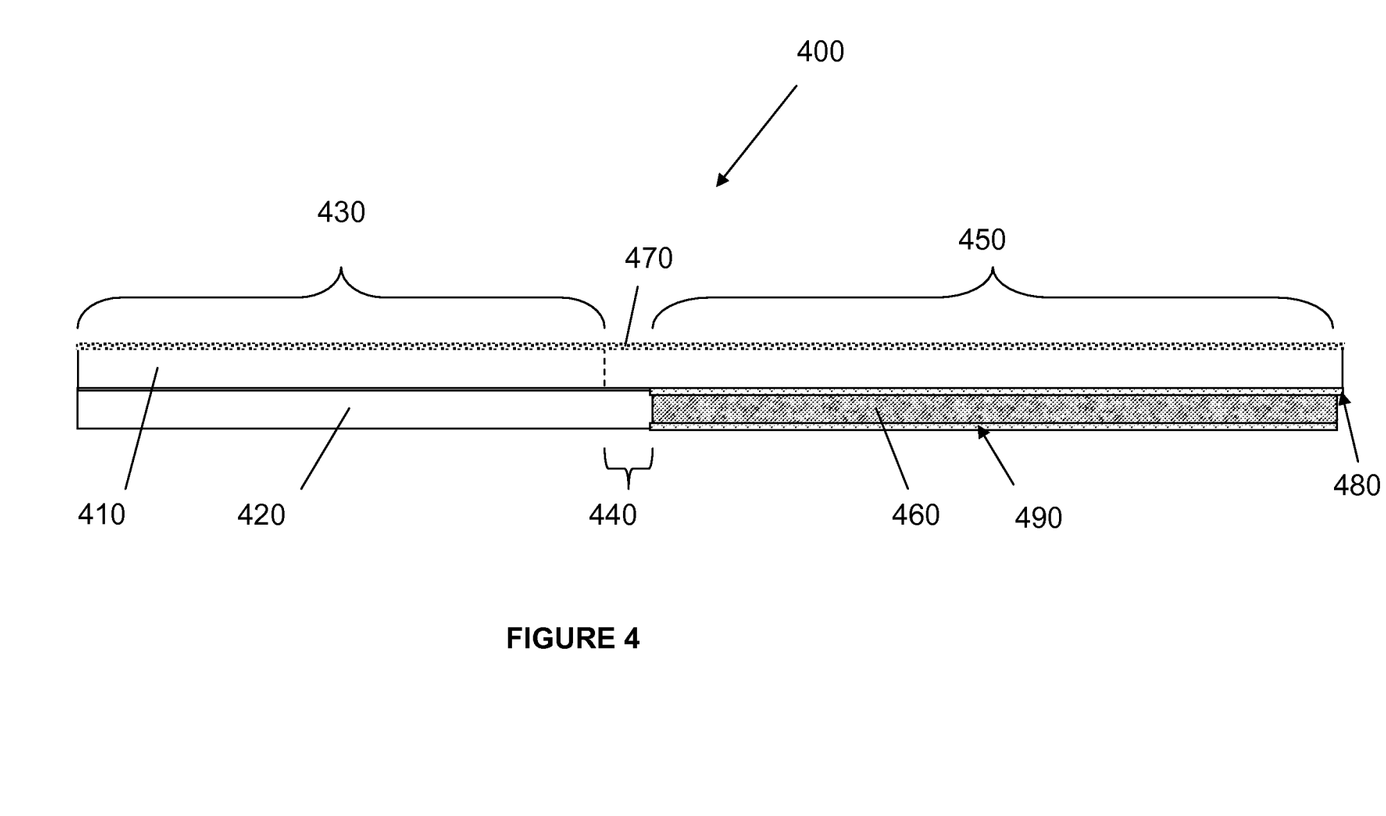
FIG. 4 illustrates a side view of another embodiment of an energy saving insulated shingle 400 constructed in accordance with the disclosed principles.

FIG. 4 illustrates a side view of another embodiment of an energy saving insulated shingle 400 constructed in accordance with the disclosed principles. The illustrated exemplary shingle 400 again includes a first shingle layer 410 and a second shingle layer 420. In addition, the shingle 400 also includes a buttlap area 430 and a headlap area 450, similar to those discussed above, as well as a common bond area 440 between these two areas. The first and second shingle layers 410, 420 may again be connected together using an adhesive, for example, a bituminous based adhesive; however, fasteners may also be employed. Once again, however, although a two-layer shingle 400 is illustrated, any type of shingle may be employed with the disclosed principles, such as single layer strip shingles, or three-layer composite shingles.

This embodiment of the shingle 400 also includes an insulation material 460 located in the headlap area 450, adjacent to the common bond area 440 and on the interior surface of the first shingle layer 410. In accordance with the disclosed principles, the insulation material 460 may be adhered to the headlap area 450, and extends the entire width of the shingle 400 from side to side, as well as from its top edge towards the common bond area 440 to about the surface area of the designed exposure surface of the shingle 400. In addition, however, the insulation material 460 may alternatively be formed into and/or as part of the headlap area 450 of the first shingle layer 410, as discussed above with reference to the prior embodiments of the disclosed shingles.

In addition to the advantages described above with respect to the prior embodiment, the disclosed principles may be further enhanced by combining the insulation material 460 on the back of the headlap area 450 of the shingle 400 with reflective surface treatments on the exposed portion of the shingle 400. In the illustrated embodiment, reflective granules 470, such as those produced by 3M or ISP Minerals, could enhance the energy efficiency of the disclosed insulated shingle 400. Of course, other source and type of reflective granules 470 may also be used, and granules 470 may be selectively located on only portions of the shingle 400 if desired. Moreover, metal foil may also be applied to the exposed surfaces of the shingle 400 with the insulation material 460 adhered to the back of the shingle's headlap area 450. Reflective granule-coated or paint-coated metal with reflective materials may also be employed on the exposed surface of the shingle 400.

Also illustrated in FIG. 4, the benefits of the disclosed insulated shingles may be further enhanced with a radiant barrier 480 combined with the insulation material 460. For example, a foil radiant barrier 480 may be laminated to one of the surfaces of the insulation material 460 before or during the application of the insulation material 460 to the headlap area 450 of the shingle 400. Furthermore, a second radiant barrier 490 may also be added in the headlap area 450 of the shingle 400. More specifically, the second radiant barrier 490 may be located on the opposite side of the insulation material 460 than the first radiant barrier 480, which is located between the insulation material 460 and the first shingle layer 410. By providing one or more radiant barriers in addition to the insulation material 460, the insulation efficiency of a shingle 400 constructed in accordance with the disclosed principles may be further increased since such radiant barriers help reflect waves of solar radiation away from the underlying roof deck.

Table 1, set forth below, provides a summary of insulation value testing data on various configurations of an energy saving insulated shingle constructed in accordance with the disclosed principles. In addition, the bottom row of Table 1 provides fire testing data on the various configurations of shingles, as performed by Underwriters Laboratories. In the tested embodiments, the novel shingles did not include radiant barriers.

Specifically, the foam by itself has an R-value of 4.4, while the base shingle has an R-value of 0.9 without the foam. Combined these two have an R-value of 5.3.

Table 2, included below, provides the test results of shingle surface temperatures, temperatures of the backside of shingles between the shingle and roof deck, and the temperatures of the backside of the roof deck (i.e., the interior of an attic), taken a various times throughout a day. The primary purpose of these tests was to determine the temperatures of the backside of the roof deck (e.g., ½ inch plywood was used) for various insulated shingles constructed according to the disclosed principles, versus a control of an uninsulated shingle and of the bare plywood. During the test, the test samples were exposed all day long, and the temperature readings taken at the noted times of day. For the shingles, all test shingles were GAF-Elk Timberline Natural Shadow Weatherwood color.

TABLE 1

|  | 30 year laminated shingle | Closed cell expanded polystyrene | Extruded EPS | Yellow open cell FR foam | 2X sided foil bubble radiant barrier | Great Stuff spray foam* | 2 part Polyurethane spray foam |
|---|---|---|---|---|---|---|---|
| Insulation thickness | 0" | 0.125" | 0.250" | 0.350" | 0.3125" | 0.500" | 0.74" |
| R-value | 0.9 | 1.2 | 1.9 | No test | No test | 3.0 | 5.3 |
| k-value | 0.54 | 0.51 | 0.42 | No test | No test | 0.39 | 0.168 |
| Class A burning brand | Pass | No test | 1 Pass 1 Fail | Pass | Pass | TBD | TBD |

The 2 part polyurethane spray foam shingle samples had the foam portion tested separately to get a more accurate test.

TABLE 2

| Time | Location | ½" Spray Foam | ⅛" Closed Cell PS | ¼" EPS Foam | Control (Bare Shingle) | Bare ½" Plywood |
|---|---|---|---|---|---|---|
| 1:30 PM | Shingle front | 143 | 139 | 143 | 143 | 115 |
|  | Deck back | 102 | 112 | 109 | 117 | 107 |
|  | % Drop | 29% | 19% | 24% | 18% | 7% |
|  | Back Shingle | 110 | 124 | 120 | 137 |  |
|  | % Drop | 23% | 11% | 16% | 4% |  |
| 3:00 PM | Shingle front | 156 | 160 | 161 | 154 | 122 |
|  | Deck back | 103 | 112 | 109 | 116 | 111 |
|  | % Drop | 34% | 30% | 32% | 25% | 9% |
|  | Back Shingle | 110 | 122 | 120 | 142 |  |
|  | % Drop | 29% | 24% | 25% | 8% |  |
| 5:00 PM | Shingle front | 157 | 157 | 163 | 154 | 123 |
|  | Deck back | 103 | 113 | 111 | 121 | 111 |
|  | % Drop | 34% | 28% | 32% | 21% | 10% |
|  | Back Shingle | 113 | 125 | 121 | 146 |  |
|  | % Drop | 28% | 20% | 26% | 5% |  |

The various types of insulation are set forth in the Table, and the figures set forth in the Table are degree measured on the Fahrenheit scale using a Raytek Raynger ST non-contact thermometer. The ¼" insulation used on these samples is made by the Owens Corning Corporation and is a fan fold ¼" thick extruded semi-rigid polystyrene insulation. The ⅛ inch insulation was a ⅛ inch closed cell polystyrene insulation. The spray insulation used was made using Great Stuff® spray foam insulation along with a spray adhesive.

The ½ inch spray foam sample reduced the heat on the backside of the shingle and above the plywood by an average of 30.6 degrees less than the control. The backside of the plywood on this same sample averaged 15.3 degrees less than the control. The ⅛ inch closed cell PS foam sample reduced the heat of the backside of the shingle and above the plywood by an average of 18.0 degrees less than the control. The backside of the plywood on this sample averaged 5.7 degrees less than the control. The ¼ inch extruded PS foam sample reduced the heat on the backside of the shingle and above the plywood by an average of 21.3 degrees less than the control. The backside of the plywood on this same sample averaged 8.3 degrees less than the control. In sum, the difference in the amount of heat transferred through the shingle and through the plywood correlates to the thickness or R-Value of the insulation material used on the shingles and constructed in accordance with the disclosed principles.

Table 3 illustrates a second temperature test performed on shingle samples similar to those whose test results are provided in Table 2 above, but performed on only an exposure of the shingle for 90 minutes and the temperature readings taken at the noted time of day. However, in this test, the ⅛ inch PS foam is replaced in the test by a 5/16 inch bubble insulation having aluminum foil adhered to both of its surfaces. Again the test results are provided in the table in degrees measured on the Fahrenheit temperature scale using the same non-contact thermometer used in the prior test. As shown in the data, the test results in this test comport with the results from the prior test discussed above.

TABLE 3

| Time | Location | ½" Spray Foam | 5/16" Bubble 2X Sides Foil | ¼" EPS Foam | Control | Bare ½" Plywood |
|---|---|---|---|---|---|---|
| 4:30 PM | Shingle front | 148 | 149 | 150 | 142 | 113 |
| | Deck back | 106 | 110 | 111 | 116 | 106 |
| | % Drop | 28% | 26% | 26% | 18% | 6% |
| | Back Shingle | 110 | 117 | 116 | 130 | |
| | % Drop | 26% | 21% | 23% | 8% | |

Figure 5:
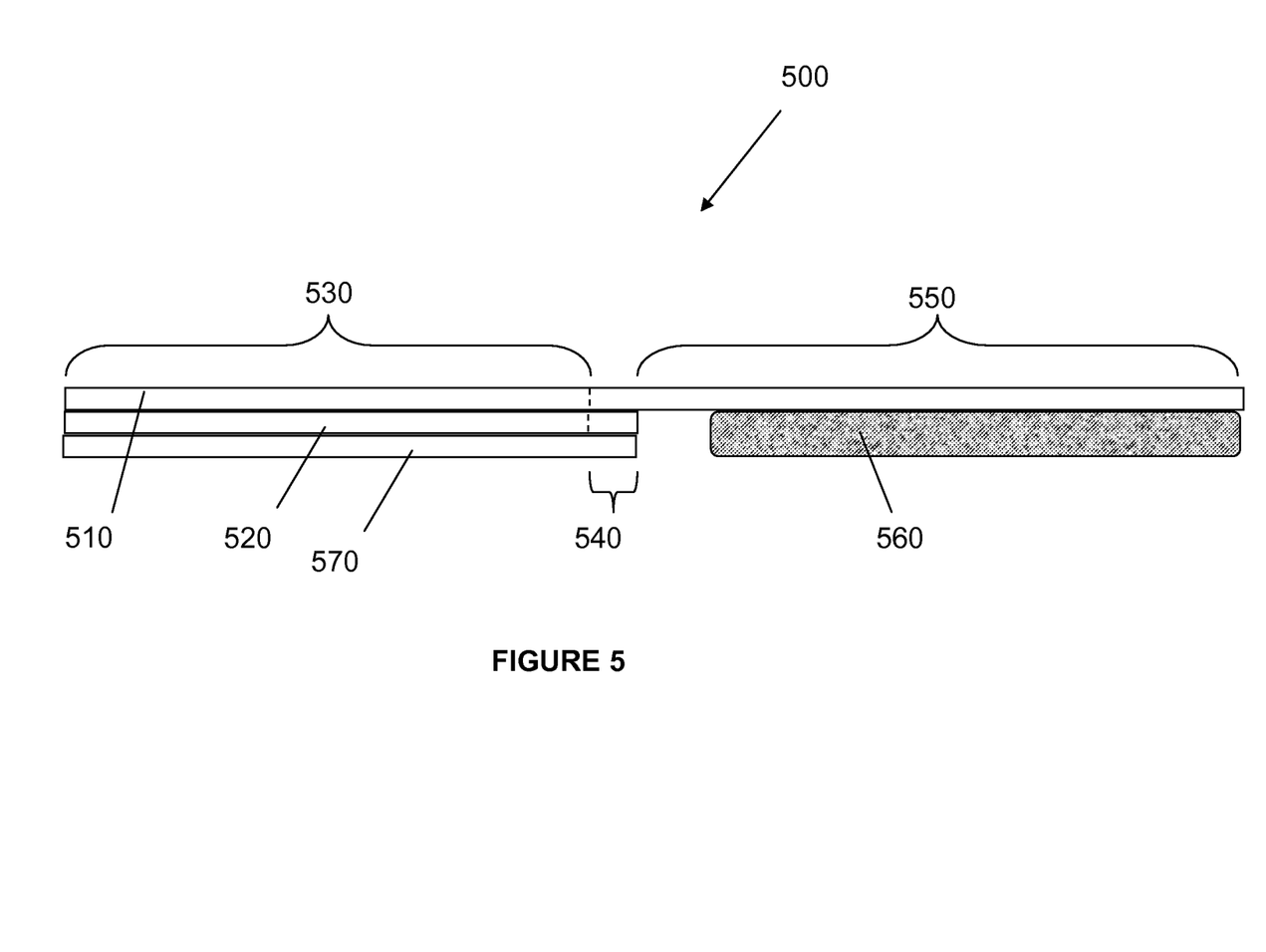
FIG. 5 illustrates a side view of a further embodiment of an energy saving insulated shingle constructed in accordance with the disclosed principles having three shingle layers.

FIG. 5 illustrates a side view of another embodiment of an energy saving insulated shingle 500 constructed in accordance with the disclosed principles. This exemplary shingle 500 is similar to the shingle 100 illustrated in FIG. 1, with a key difference. The shingle 500 again includes a first shingle layer 510 and a second shingle layer 520. In addition, the shingle 500 also includes a buttlap area 530 and a headlap area 550, similar to those discussed above, as well as a common bond area 540 between these two areas.

However, this shingle 500 also includes a third shingle layer 570. The first, second and third shingle layers 510, 520, 570 may also be connected together using an adhesive, for example, a bituminous based adhesive; however, fasteners may also be employed. Collectively, the first, second and third shingle layers 510, 520, 570 form the buttlap area of the shingle 500. As such, portions of the third layer 570 may also be visible up through the first layer 510 in the buttlap area 530, and thus provide a further portion of the exposure surface of the shingle 500.

This embodiment of the shingle 500 also includes an insulation material 560 located in the headlap area 550, adjacent to the common bond area 540 and on the interior surface of the first shingle layer 510. As discussed above, the insulation material 560 may be adhered to either side of the first layer 510 in the headlap area 550, and extends the entire width of the shingle 500 from side to side, as well as from its top edge towards the common bond area 540. As a result, the insulation material 560 may again extend to about the surface area of the designed exposure surface of the shingle 500 once the headlap 550 and some or all of the common bond area 540 of the shingle 500 have been overlapped by a second shingle when installed on a roofing structure. In addition, however, the insulation material 560 may alternatively be formed into and/or as part of the headlap area 550 of the first shingle layer 510, as discussed above with reference to the prior embodiments of the disclosed shingles. Also as illustrated, the insulation material 560 may have a thickness selected so that its combination with the headlap area 550 of the first layer 510 results in an overall substantially equal thickness to the thickness of the first, second and third shingle layers 510, 520, 570.

Figure 6:
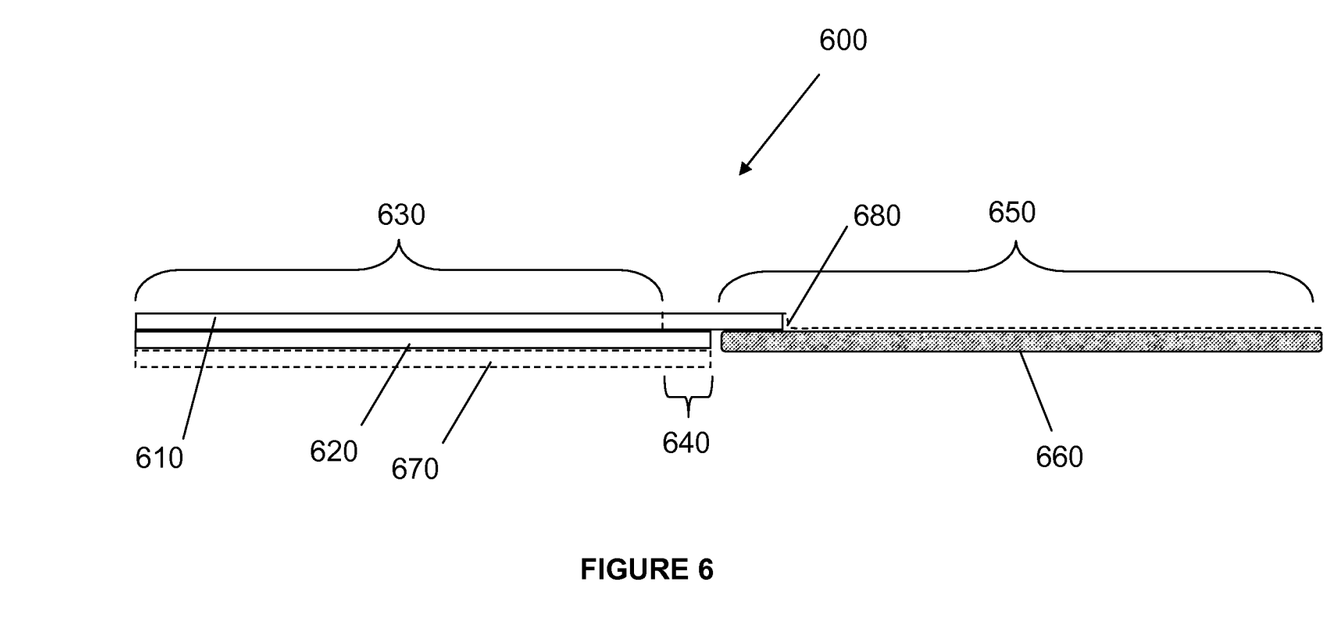
FIG. 6 illustrates a side view of yet another embodiment of an energy saving insulated shingle constructed in accordance with the disclosed principles where the insulation material itself forms the headlap area of the shingle.

FIG. 6 illustrates a side view of yet another embodiment of an energy saving insulated shingle 600 constructed in accordance with the disclosed principles. The illustrated exemplary shingle 600 again includes a first shingle layer 610 and a second shingle layer 620. The first and second shingle layers 610, 620 may again be connected together using an adhesive, for example, a bituminous based adhesive; however, fasteners may also be employed. Once again, however, although a two-layer shingle 600 is illustrated, any type of shingle may be employed with the disclosed principles, such as single layer strip shingles, or three-layer composite shingles.

This embodiment of the shingle 600 also includes an insulation material 660 located in the headlap area 650 of the shingle 600, adjacent to the common bond area 640. Thus, while the shingle 600 includes a buttlap area 630 and a headlap area 650 as have other shingles described herein, in this embodiment the insulation material 660 itself provides the headlap area 650 of the shingle 600. Therefore, in accordance with the disclosed principles, the insulation material 660 can extend the entire width of the shingle 600 from side to side to about the surface area of the designed exposure surface of the shingle 600 by providing the headlap area 650.

In this embodiment, the insulation material 660 is adhered or otherwise connected to a portion of the first layer 610 near the common bond area 640, and extends rearward to provide the headlap portion of the shingle 600. In other embodiments, the insulation material 660 may be connected to the second layer 620 (or third layer 670 or other additional layers, optionally shown in broken line) instead of the first layer 610. Moreover, the insulation material 660 may be integrally formed with the first layer 610 (or second, etc. layer) rather than connected thereto. For example, the material used for the insulation layer 660 may be used as one or more of the laminate layers within the first layer 610 or the second layer 620, etc. Still further, no matter how formed, the insulation material 660 may further include a bituminous (e.g., asphalt) coating 680 (optionally shown in broken line) over its top surface to assist in sealing the insulation material 660 (if needed), and to assist in adherence to a second shingle (not illustrated) placed over the headlap area 650 of the shingle 600. Moreover, that bituminous layer may also be blended or otherwise integrated with a bituminous layer of the first layer 610, or whatever layer the insulation material 660 is connected to or formed with.

In addition, as with all of the other embodiments of the disclosed principles, the shingle 600 may be further enhanced by providing reflective surface treatments (e.g., granules) on the exposed portion of the shingle 600. Moreover, metal foil may also be applied to the exposed surfaces of the shingle 600, as well as radiant barriers placed on the exterior surface of the insulation material 660, the interior surface of the insulation material 660, or on both surfaces.

While various embodiments of the apparatuses, systems and methods constructed according to the principles disclosed herein are disclosed herein and have been described above, it should be understood that they have been presented by way of example only, and not limitation. The breadth and scope of the invention(s) should thus not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Multiple inventions are set forth according to the limitations of the multiple claims associated with this disclosure, and the claims accordingly define the invention(s), and their equivalents, that are protected thereby. In all instances, the scope of the claims should not be constrained by the headings set forth herein.

What is claimed is:

1. A composition roofing shingle, comprising:
   a bituminous laminate comprising a buttlap area and a common bond area, and having an interior surface and an exterior surface, wherein only the exterior surface of only the buttlap area of the bituminous laminate provides at least an initial portion of an exposure surface of the shingle while the exterior surface of the common bond area is configured to be overlapped by a portion of a second shingle; and
   an insulator, wherein the insulator alone provides a headlap area, the insulator having an interior surface and an exterior surface, wherein portions of the exterior surface of the insulator are attached directly to the interior surface of the bituminous laminate at a top edge of the common bond area, the insulator extending from the interior surface of the bituminous layer at the common bond area an amount substantially equal to the exposure surface of the shingle.

2. A composition roofing shingle according to claim 1, wherein the shingle further comprises reflective surface treatments on at least the exposure surface of the bituminous laminate.

3. A composition roofing shingle according to claim 2, wherein the reflective surface treatments comprise reflective granules.

4. A composition roofing shingle according to claim 1, further comprising a metal foil displaced on at least the exposure surface of the shingle.

5. A composition roofing shingle according to claim 1, further comprising a radiant barrier between the insulator and the bituminous laminate.

6. A composition roofing shingle according to claim 5, wherein the radiant barrier comprises metal foil laminated on the insulator.

7. A composition roofing shingle according to claim 6, further comprising a second radiant barrier also comprising metal foil, the second radiant barrier laminated on a surface of the insulator opposite the first radiant barrier.

8. A composition roofing shingle according to claim 1, wherein the buttlap and common bond areas of the bituminous laminate comprise a first thickness of the shingle, and wherein the insulator comprises a second thickness of the shingle.

9. A composition roofing shingle according to claim 1, wherein the insulator is attached to the interior surface of the bituminous laminate.

10. A composition roofing shingle, comprising:
    a bituminous first layer comprising a buttlap area and a common bond area, the first layer having an interior surface and an exterior surface, wherein only the exterior surface of only the buttlap area of the first layer provides at least an initial portion of an exposure surface of the shingle while the exterior surface of the common bond area of the first layer is configured to be overlapped by a portion of a second shingle;
    a bituminous second layer comprising a buttlap area and a common bond area, the second layer having an interior surface and an exterior surface, wherein portions of the exterior surface of the second layer are adhesively coupled to the interior surface of the buttlap and common bond areas of the first layer and wherein the buttlap areas and common bond areas of the first and second layers are aligned and coextensive; and
    an insulator, wherein the insulator alone provides a headlap area, the insulator having an interior surface and an exterior surface, wherein portions of the exterior surface of the insulator are attached directly to the interior surface of the first layer at the common bond area, the insulator extending from the interior surface of the first layer at the common bond area an amount substantially equal to the exposure surface of the shingle.

11. A composition roofing shingle according to claim 10, wherein the shingle further comprises reflective surface treatments on at least the exposure surface of the first layer.

12. A composition roofing shingle according to claim 11, wherein the reflective surface treatments comprise reflective granules.

13. A composition roofing shingle according to claim 10, wherein the bituminous first and second layers comprise asphalt.

14. A composition roofing shingle according to claim 10, further comprising a metal foil displaced on at least the exposure surface of the shingle.

15. A composition roofing shingle according to claim 10, further comprising a radiant barrier disposed on at least the exposure surface of the shingle.

16. A composition roofing shingle according to claim 15, wherein the radiant barrier comprises metal foil laminated on the insulator.

17. A composition roofing shingle according to claim 16, further comprising a second radiant barrier also comprising metal foil, the second radiant barrier laminated on a surface of the insulator opposite the first radiant barrier.

18. A composition roofing shingle according to claim 10, wherein the buttlap and common bond areas of the second layer are adhesively coupled to the buttlap and common bond area of the first layer, the adhesively coupled buttlap and common bond areas of the second layer comprises a first thickness of the shingle, and wherein the insulator is adhesively coupled to the headlap area of the first layer, the insulator comprises a second thickness of the shingle.

19. A composition roofing shingle according to claim 10, wherein the first and second layers comprise distinct layers of the shingle, and wherein portions of the exterior surface of only the buttlap area of the second layer are exposed through the buttlap area of the first layer to provide another portion of the exposure surface of the shingle.

20. A composition roofing shingle according to claim 19, further comprising a bituminous third shingle layer comprising a buttlap area and a common bond area, the third layer having an interior surface and an exterior surface, wherein portions of the exterior surface of the third layer are adhesively coupled to the interior surface of the buttlap area and common bond area of the second layer, and wherein the buttlap portions and common bond areas of the second and third layers are aligned and coextensive and portions of the exterior surface of only the buttlap area of the third layer are exposed through the buttlap area of the first layer to provide a further portion of the exposure surface of the shingle.

21. A composition roofing shingle according to claim 10, wherein the insulator is adhesively coupled to the interior surface of the first layer of the shingle.

22. A method of manufacturing a composition roofing shingle, the method comprising:
    forming a bituminous first layer comprising a, a buttlap area and a common bond area, the first layer having an interior surface and an exterior surface, wherein only the exterior surface of only the buttlap area of the first layer provides at least an initial portion of an exposure surface of the shingle while the exterior surface of the common bond area of the first layer is configured to be overlapped by a portion of a second shingle;
    forming a bituminous second layer comprising a buttlap area and a common bond area, the second layer having an interior surface and an exterior surface;
    adhesively coupling portions of the exterior surface of the second layer to the interior surface of the buttlap area and common bond area of the first layer, wherein the buttlap portions and common bond areas of the first and second layers are aligned and coextensive, and wherein portions of the exterior surface of the buttlap area of the second layer are exposed through the buttlap area of the first layer to provide another portion of the exposure surface of the shingle; and
    attaching portions of an exterior surface of an insulator directly to the interior surface of the first layer at the common bond area, and extending from the interior surface of the first layer at the common bond area an amount substantially equal to the exposure surface of the shingle, wherein the insulator alone provides a headlap area.

23. A method according to claim 22, further comprising placing reflective surface treatments on at least the exposure surface of the shingle.

24. A method according to claim 23, wherein the reflective surface treatments comprise reflective granules.

25. A method according to claim 22, wherein the bituminous first and second layers comprise asphalt.

26. A method according to claim 22, further comprising displacing a metal foil displaced on at least the exposure surface of the shingle.

27. A method according to claim 22, further comprising placing a radiant barrier between the insulator and the first layer.

28. A method according to claim 27, further comprising laminating a second radiant barrier on a surface of the insulator opposite the first radiant barrier.

29. A method according to claim 22, wherein the buttlap and common bond areas of the second layer being adhesively coupled to the buttlap and common bond area of the first layer comprises a first thickness of the shingle, and wherein the insulator adhesively coupled to the headlap area of the first layer comprises a second thickness of the shingle, the second thickness substantially equal to the first thickness.

30. A method according to claim 22, wherein attaching the insulator to the first layer comprises attaching the insulator to the interior surface of the first layer of the shingle.

31. A method according to claim 22, wherein forming bituminous first and second layers comprises forming distinct bituminous first and second layers of the shingle, and wherein portions of the exterior surface of only the buttlap area of the second layer are exposed through the buttlap area of the first layer to provide another portion of the exposure surface of the shingle.

32. A method according to claim 31, further comprising forming a bituminous third shingle layer comprising a buttlap area and a common bond area, the third layer having an interior surface and an exterior surface, and further comprising adhesively coupling portions of the exterior surface of the third layer to the interior surface of the buttlap area and common bond area of the second layer, wherein the buttlap portions and common bond areas of the second and third layers are aligned and coextensive and portions of the exterior surface of only the buttlap area of the third layer are exposed through the buttlap area of the first layer to provide a further portion of the exposure surface of the shingle.

33. A composition roofing shingle, comprising:
    a bituminous first layer comprising a buttlap area and a common bond area, the first layer having an interior surface and an exterior surface, wherein the exterior surface of the buttlap area of the first layer provides an initial portion of an exposure surface of the shingle;
    a bituminous second layer comprising a buttlap area and a common bond area, the second layer having an interior surface and an exterior surface, wherein portions of the exterior surface of the second layer are adhesively coupled to the interior surface of the buttlap area and common bond area of the first layer;
    wherein the buttlap and common bond areas of the first and second layers are aligned and coextensive, and wherein portions of the exterior surface of the buttlap area of the second layer are exposed through the buttlap area of the first layer to provide another portion of the exposure surface of the shingle; and
    an insulator, wherein the insulator alone provides a headlap area, the insulator attached directly to the interior surface of the first layer at a top edge of the headlap area and proximate to the common bond area of the first layer, the insulator extending from the interior surface of the first layer at the common bond area an amount substantially equal to the exposure surface of the shingle and providing a headlap area of the shingle configured to be overlapped by a portion of second shingle.

34. A composition roofing shingle according to claim 33, wherein the shingle further comprises reflective granules on at least the exposure surface of the shingle.

35. A composition roofing shingle according to claim 33, further comprising a metal foil displaced on at least the exposure surface of the shingle.

36. A composition roofing shingle according to claim 33, wherein the radiant barrier comprises metal foil laminated on the insulator, the shingle further comprising a second radiant barrier also comprising metal foil laminated on a surface of the insulator opposite the first radiant barrier.

37. A composition roofing shingle according to claim 33, wherein the bituminous first and second layers comprise asphalt.

38. A composition roofing shingle according to claim 33, further comprising a bituminous material displaced on an exterior surface of the insulation material, and being blended with the bituminous first layer.

39. A composition roofing shingle according to claim 33, further comprising a bituminous third shingle layer comprising a buttlap area and a common bond area, the third layer having an interior surface and an exterior surface, wherein portions of the exterior surface of the third layer are adhesively coupled to the interior surface of the buttlap area and common bond area of the second layer, and wherein the buttlap portions and common bond areas of the second and third layers are aligned and coextensive and portions of the exterior surface of only the buttlap area of the third layer are exposed through the buttlap area of the first layer to provide a further portion of the exposure surface of the shingle.

* * * * *